United States Patent
Bertacchini et al.

(10) Patent No.: US 11,402,481 B2
(45) Date of Patent: Aug. 2, 2022

(54) SYSTEMS FOR DETECTING OBJECTS IN ENVIRONMENTS

(71) Applicant: Inxpect S.p.A., Brescia (IT)

(72) Inventors: Ugo Bertacchini, Brescia (IT); Alessio Degani, Brescia (IT); Marco Garatti, Brescia (IT); Andrea Tartaro, Brescia (IT)

(73) Assignee: INXPECT S.p.A., Brescia (IT)

( * ) Notice: Subject to any disclaimer, the term of this patent is extended or adjusted under 35 U.S.C. 154(b) by 253 days.

(21) Appl. No.: 16/789,314

(22) Filed: Feb. 12, 2020

(65) Prior Publication Data

US 2020/0264294 A1     Aug. 20, 2020

(30) Foreign Application Priority Data

Feb. 18, 2019    (IT) ........................ 102019000002319

(51) Int. Cl.
    *G01S 13/34*           (2006.01)
    *G01S 7/40*            (2006.01)
    (Continued)

(52) U.S. Cl.
    CPC ............ *G01S 13/34* (2013.01); *G01S 7/4056* (2013.01); *G01S 13/003* (2013.01); *H04W 24/06* (2013.01); *G01S 7/352* (2013.01)

(58) Field of Classification Search
    CPC ........ G01S 13/003; G01S 13/04; G01S 13/34; G01S 13/886; G01S 7/352; G01S 7/4008;
(Continued)

(56) References Cited

U.S. PATENT DOCUMENTS

| 10,057,795 B2 | 8/2018 | Starzer et al. |
| 10,278,084 B2 | 4/2019 | Starzer et al. |

(Continued)

FOREIGN PATENT DOCUMENTS

| DE | 29716601 U1 | 11/1997 |
| DE | 102016110344 A1 | 12/2017 |
| WO | 1998/040694 A1 | 9/1998 |

OTHER PUBLICATIONS

Italian Search Report and Written Opinion dated Oct. 22, 2019, in IT Application No. 102019000002319, 12 pages.

*Primary Examiner* — Timothy X Pham
(74) *Attorney, Agent, or Firm* — MH2 Technology Law Group LLP (57) ABSTRACT

A system for detecting objects in an environment, comprising a measuring system and a processing unit in signal communication with the measuring system, wherein:
the measuring system comprises macro-components formed of respective subcomponents, wherein the macro-components comprise:
a waveform generator configured to provide an electrical signal to be transmitted with a predetermined waveform,
transmitting and receiving means configured to transmit a first electromagnetic signal matching the electrical signal to be transmitted and to receive from the environment a second electromagnetic signal generated by a reflection of the first electromagnetic signal, thereby providing a received signal matching the second electromagnetic signal,
an analog conditioning circuit configured to provide a baseband electrical signal by baseband converting the received signal, and (Continued)

an analog-to-digital converter configured to provide a digital signal which is a discrete sequence of values obtained by sampling the baseband electrical signal in plural time instants.

13 Claims, 2 Drawing Sheets

(51) Int. Cl.
*G01S 13/00* (2006.01)
*H04W 24/06* (2009.01)
*G01S 7/35* (2006.01)

(58) Field of Classification Search
CPC .... G01S 7/4017; G01S 7/4021; G01S 7/4056; H04W 24/06
See application file for complete search history.

(56) References Cited

U.S. PATENT DOCUMENTS

| | | |
|---|---|---|
| 2007/0013497 A1 | 1/2007 | Watanabe |
| 2007/0171123 A1 | 7/2007 | Nakano et al. |
| 2008/0231497 A1* | 9/2008 | Sakamoto ................. G01S 7/35 342/70 |
| 2009/0111413 A1* | 4/2009 | Luschi ................. H04B 1/7115 455/230 |
| 2017/0169627 A1 | 6/2017 | Kim et al. |
| 2018/0038943 A1 | 2/2018 | Ramasubramanian et al. |
| 2020/0142023 A1* | 5/2020 | Markhovsky ......... H04W 4/023 |

* cited by examiner

SYSTEMS FOR DETECTING OBJECTS IN ENVIRONMENTS

CROSS-REFERENCE TO RELATED APPLICATION(S)

This application claims priority under 35 U.S.C. § 119 from Italian Patent Application No. 102019000002319, filed on Feb. 18, 2019, in the Italian Patent and Trademark Office ("IPTO"), the entire contents of which are incorporated herein by reference.

FIELD OF THE INVENTION

The present invention relates to the detection of objects in an environment to be monitored, e.g. using radar technologies. More in detail, the invention relates to a detection system that can perform self-diagnostic tasks.

BACKGROUND ART

A known type of systems for detecting objects in an environment, such as radar systems, provides transmitting an electromagnetic signal into an environment to be monitored, receiving the signal reflected from the environment and the objects therein, and various processing steps for processing these signals to determine the position of the objects in the environment.

These systems may be used in various fields, including the fields of intrusion alarms and enterprise safety in environments requiring a minimum distance to be constantly maintained between persons and moving parts of machinery.

A critical requirement in these applications is to ensure continuous operation of the detection system, to avoid, for example, that a hazardous situation for a machinery operator might not be indicated by the system. This need is even more strongly felt where the detection system provides both alarm signals and control commands intended to halt the operation of the potentially dangerous machinery.

In certain detection systems arrangements are provided for detecting substantially complete shutdowns of the system. Nevertheless, the applicant found that there is a wide range of possible anomalies of the system that might lead to failed object detection, even without causing a shutdown of the system. Therefore, these dangerous anomalies are not automatically recognized in the detection systems that use traditional diagnostic methods.

US 2018/0038943 A1 describes a diagnostic method for radar systems. The system to be diagnosed, after receiving the radar signal from reflections in the environment and before digitization, performs a separate analog processing an in-phase component and a quadrature component of the signal. Thus, the diagnostic calculates parameters mainly based on combinations of the values sampled in the two channels, for recognizing faults in a specific one of the two analogic channels. In fact, the parameters are the ratio of the mean energies of the two channels, the cross correlation between the values measured in the two channels, and specific complex spectral components (which accordingly are inclusive of in-phase and quadrature data).

This diagnostic is limited only to very specific faults, and the document does not enable foreseeing if other fault types upstream or downstream the in-phase or quadrature channels will have some effect on the calculated parameters. For example, if during use the deviation of one such parameter is detected, the fault may happen not to be one of those described, but to be really caused by problems in sampling or in transmission/reception of the signal.

WO 1998/040694 A1 describes diagnostics for radar systems too. The signal analog processing provide a baseband signal which is not directly sampled, but is analogically divided in single harmonic components, which are rectified for detecting their amplitude. Diagnostic can be based for example on noise levels obtained from these harmonic components. Thus, this method is equivalent to diagnostics based on the signal frequency spectrum, and not on the time pattern of the baseband signal, being sampled as such.

US 2007/0171123 A1 describes a fault detection method for a radar system. The method specifically addresses faults in a switch controlling the alternation of antennas operation. The parameter disclosing such faults is power, calculated from the signal frequency spectrum, i.e. after Fourier transform. However, no indication is provided on how to discern faults upstream or downstream the switch, and on how such faults may affect the measured parameter.

SUMMARY OF THE INVENTION

The object of the present invention is to address the aforementioned prior art problems. In detail, one object is to allow detection of various operation anomalies in a detection system, including types of anomalies that do not lead to shut-down, thereby affording corrective actions to be timely taken before the occurrence of hazard situations.

A further object of the invention is to simplify identification of the component in which the anomaly occurs, along the entire chain of signal generation, transmission, reception, as well as its analog and digital processing, and identification of the type of anomaly that affects the component.

These and other objects are fulfilled by a system for detecting objects in an environment as defined in any of the accompanying claims. In particular, after generating and transmitting an electromagnetic signal and later receiving the signal reflected from the environment, that is baseband converted and digitized, the system performs the diagnostic task by analyzing the digitized signal.

Various anomalies of the detection chain may be inferred from the digitized signal. On the other hand, further processing and analysis, as typically provided in detection systems, which lead to object detection, e.g. using Fourier transforms, provide information that are less indicative of anomalies.

In preferred embodiments, the diagnostic task performed at the processing unit controls parameters selected in the group of maximum, minimum and mean values, maximum peak-to-peak amplitudes and/or number of zero values, for the digitized signal or the derivative thereof. Advantageously, specific deviations of such parameters are indicative of anomalies in specific components which together contribute to the acquisition of detection data. These parameters further provide some understanding of the anomaly type. Therefore, by monitoring the parameters the system can generate well-targeted alarm signals on the possible problem to be solved.

BRIEF DESCRIPTION OF FIGURES

Further features and advantages of the present invention will result more clearly from the illustrative, non-limiting description of a system for detecting objects in an environment, with respect to the accompanying drawings, in which:

FIG. 1 schematically shows a radar system according to one embodiment of the invention, FIG. 2 schematically shows a digital signal and parameters thereof, as obtained by the system of FIG. 1, FIG. 3 schematically shows a time derivative of the digital signal of FIG. 2, and parameters thereof, and FIG. 4 schematically shows comparison of a parameter with a reference range.

DETAILED DESCRIPTION

Figure 1:
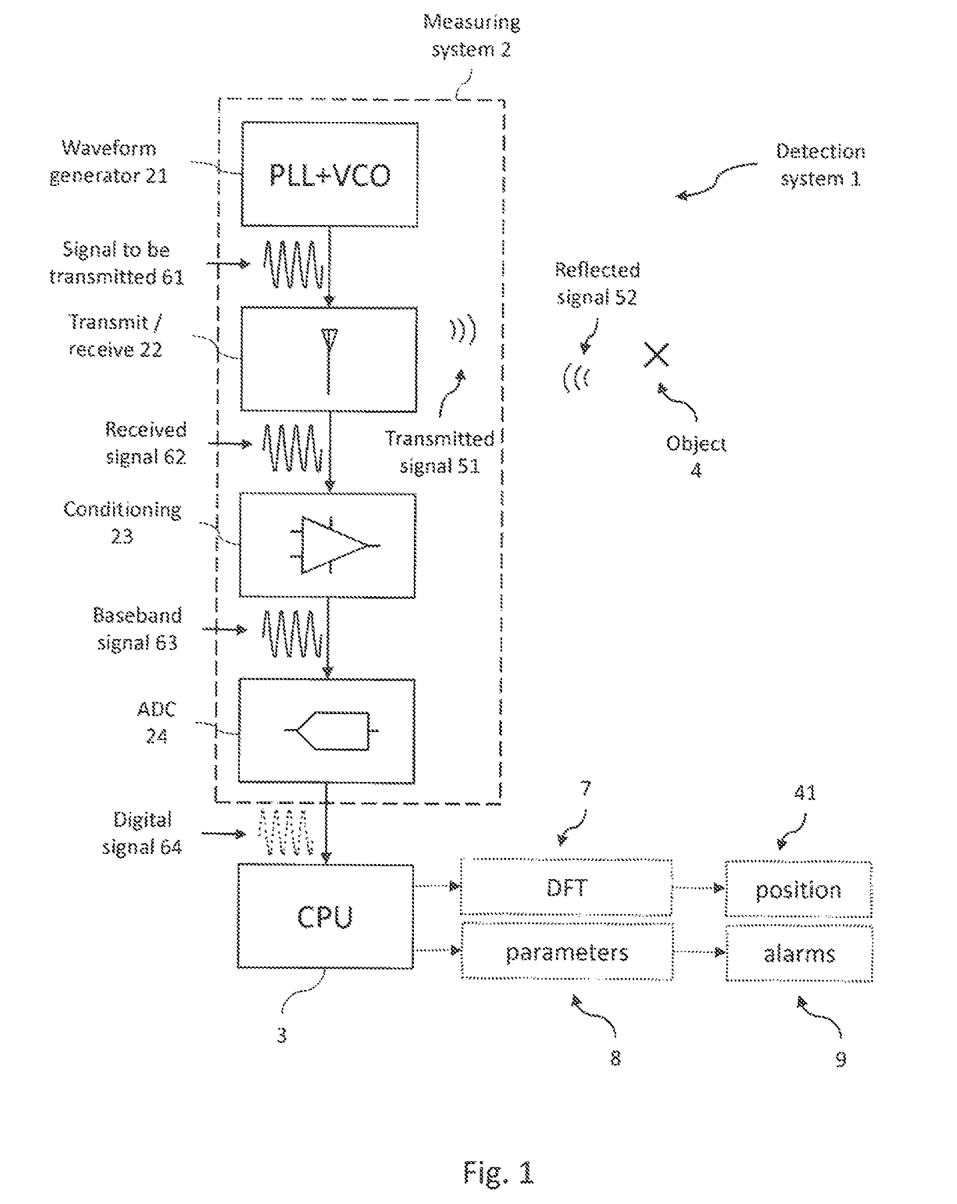

Referring to the accompanying figures, numeral 1 generally designates a system for detecting objects 4, in particular moving objects 4, located in an environment to be monitored, according to one embodiment of the invention. The detection system 1 is preferably a radar system.

The detection system 1 comprises a well-known measuring system 2, which transmits and collects the signals in the environment, and also performs signal adaptation tasks to adapt the signal for further processing. Thus, the detection system 1 comprises a processing unit 3, which is in signal communication with the measuring system 2, to analyze the output signal of the measuring system 2 using known methods and to detect the objects 4 in the environment.

In one aspect of the invention, the processing unit 3 is also configured to perform diagnostic tasks concerning the operation of the measuring system 2, and namely of its components.

Therefore, the components of the measuring system 2 and their operation will be first described, to understand the operation anomaly recognition modes that are implemented in the processing unit 3. In particular, the characteristics that will be first described relate to a regular operation of the measuring system 2, i.e. with no fault or anomaly condition that might affect the ability of the processing unit 3 to properly detect the objects 4 in the space being monitored.

The measuring system 2 comprises a plurality of components, which in the following will be classified as macro-components and subcomponents. Each macro-component is generally configured to provide an output signal as a function of at least one incoming operation input, which may be, for example, a signal received from another component or information stored or received from an external device. Furthermore, each component is composed of an assembly of subcomponents which are designed to convert, process, condition and/or transmit the operation input for providing the output signal.

The nature of the individual macro-components of the measuring system 2, as more clearly explained hereinafter, is well known to those skilled in the art, which will also understand which known subcomponents might compose each of them.

One of the macro-components of the measuring system 2 is a waveform generator 21. The waveform generator 21 is configured to cyclically provide an electrical signal to be transmitted 61 with a predetermined waveform. One example of waveform generator 21 comprises a Voltage-Controlled Oscillator (VCO) and/or a phase-locked loop (PLL) as subcomponents.

The predetermined waveform may be stored in the waveform generator 21 or may be communicated to the waveform generator 21 by the processing unit 3. By way of example, if the detection system 1 uses a transmission technique known as frequency modulated continuous wave (FMCW), the waveform may correspond to a signal having a linearly increasing or decreasing frequency, or an alternation of intervals with linearly increasing frequency and intervals with linearly decreasing frequency.

The measuring system 2 also comprises, as a macro-component, transmitting and receiving means 22 which are connected, at least at the transmitting parts, to the waveform generator 21.

The transmitting and receiving means 22 preferably comprise, among their subcomponents, one or more antennas for transmitting and/or receiving electromagnetic signals 51, 52. As is known in the field of radar systems, a single antenna may be used to transmit and receive electromagnetic signals 51, 52, or distinct antennas may be provided for transmission and reception respectively.

Therefore, in certain embodiments, the transmitting and receiving means 22 may be divided into distinct transmitting means and receiving means having substantially independent tasks, and in other embodiments the transmit and receive tasks coexist at least in some devices of the transmitting and receiving means 22.

The transmitting and receiving means 22 are configured to transmit into the environment, at each cycle, a first electromagnetic signal 51 whose time pattern corresponds to that of the signal to be transmitted. In case of regular operation, the first electromagnetic signal 51 is then transmitted substantially with the predetermined waveform.

As used herein, an electrical signal is intended as a voltage or a current located in a corresponding conductor of the detection system 1, and an electromagnetic signal is intended to designate an electromagnetic wave that propagates in the environment also out of conductive materials.

The transmitting and receiving means 22 are also configured to receive from the environment a second electromagnetic signal 52, generated by one or more reflections of the first electromagnetic signal 51 in the environment. Therefore, the second electromagnetic signal 52 has a waveform that matches the one of the first electromagnetic signal 51, except for time delays, attenuations, as well as possibly overlapping disturbing signals, distortions in case of objects 4 have irregular shapes, and repetitions spaced in time if there are multiple objects 4.

By receiving the second electromagnetic signal 52, the transmitting and receiving means 22 provide, for example at one or more electrical terminals of the transmitting and receiving means 22, an output electrical signal 62 received with a time pattern that matches the one of the second electromagnetic signals 52.

A further macro-component of the measuring system 2 is an analog conditioning circuit 23, which is connected to the transmitting and receiving means 22, at least at the receiving parts, and is preferably also connected to the waveform generator 21.

One of the tasks of the conditioning circuit 23 is to provide at each cycle a baseband electrical signal 63, by baseband converting the received electrical signal 62. As a result of baseband conversion, the baseband signal will have a frequency other than that of the received signal.

In the preferred embodiment, the frequency of the baseband signal is given, at each time, by a difference between the frequency of the received signal and the frequency of the signal to be transmitted, which also match the frequencies of the first and second electromagnetic signals 51, 52 respectively. This may be achieved in a known manner, for example, by multiplying the received signal by the signal to be transmitted.

The conditioning circuit 23 can also perform additional tasks related, for example, to filtering of the received signal.

In order to perform tasks such as those mentioned above, the conditioning circuit 23 may comprise subcomponents such as analog filters and mixers, which in turn are composed of electronic elements such as resistors, capacitors, diodes, transistors, operational amplifiers, and other similar electronic elements known to the skilled person (which are considered as subcomponents too).

Figure 2:
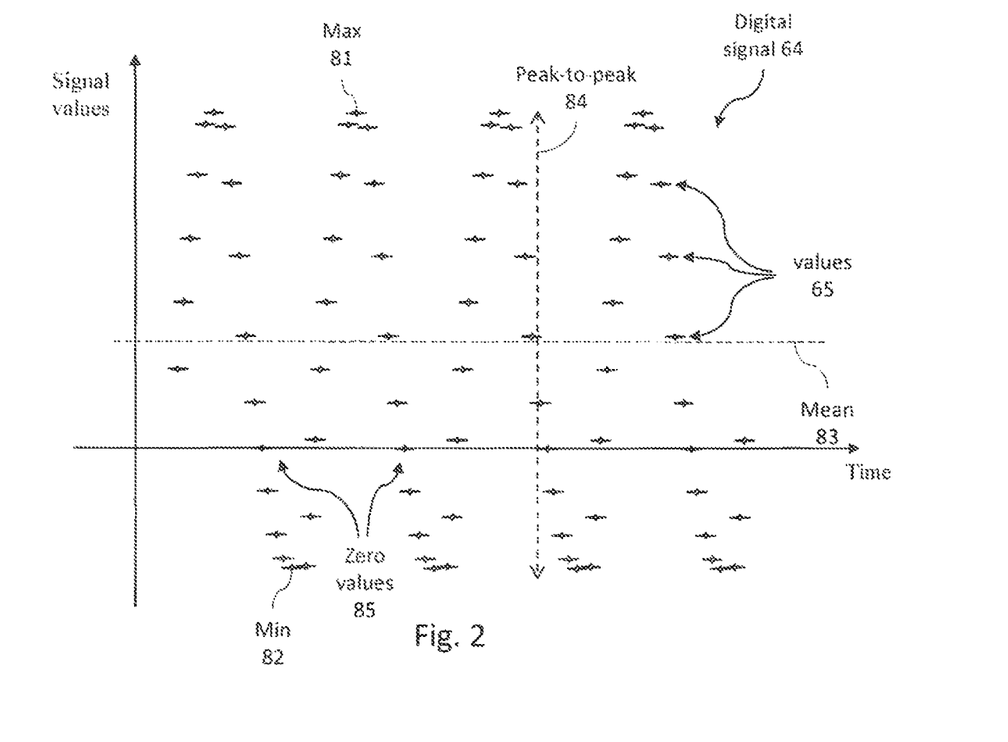

The measuring system 2 also comprises, as a macro-component, an analog-to-digital converter 24 which is configured to provide, at each cycle, a digital signal 64 matching the baseband electrical signal 63. In other words, the analog-to-digital converter 24 samples the baseband signal, and, as a result, the digital signal 64 is given by a discrete sequence of values 65, substantially equal to the values assumed by the baseband signal, in a corresponding sequence of instants. Known examples of subcomponents of the analog-to-digital converter 24 are comparators and sample-and-hold circuits.

The measuring system 2 also comprises a power supply system, composed of one or more power supply devices configured to supply power to the remaining components of the measuring system 2, in well-known manners. The power supply system may be considered as a macro-component or as a theorical grouping of subcomponents of the other macro-components.

Nevertheless, it shall be noted, for the purposes of certain parts of the description as set forth hereinbelow, that the transmitting and receiving means 22 are configured to be powered by the power supply system so as to transmit the transmission signal with a predetermined power.

Furthermore, the analog-to-digital converter 24 is configured to be supplied with power by the power supply system with a bias voltage matching a predetermined voltage value.

The bias voltage is particularly relevant in that it affects the range of input voltages that can be received and discriminated by the analog-to-digital converter 24.

In order to detect the objects 4 in the environment being monitored, the processing unit 3 is configured to calculate, at each cycle, a signal amplitude profile 7 from the digital signal 64. In the signal amplitude profile 7, signal amplitude values are associated with a set of origin positions of the signal in the environment, i.e. the positions where the first electromagnetic signal 51 is reflected thereby originating the second electromagnetic signal 52. The positions are particularly considered with reference to the transmitting and receiving means.

For example, if a single transceiver is provided, the positions may be obtained as distances from the transceiver. In further embodiments, for instance having a plurality of transmitting and/or receiving antennas, the position may be a position in a plane, given by a distance and a direction defined by an angle in the plane, or a position in space, whereby an angle of elevation is also considered.

In a FMCW-transmission, single-transceiver embodiment, the amplitude profile 7 as a function of position may be obtained by calculating a discrete Fourier transform (DFT) of the digital signal 64 to obtain an intermediate profile. The intermediate profile associates signal amplitudes with the baseband signal frequencies, i.e. the difference between the frequencies of the received signal and the signal to be transmitted.

These frequency differences are representative of the delay of the second electromagnetic signal 52 from the first electromagnetic signal 51, i.e. the distance of one object 4, having a reflective behavior for the first electromagnetic signal 51, from the transmitting and receiving means. Then, the intermediate profile may then be converted into the amplitude profile 7 as a function of position by converting the frequency values into position values, using a constant multiplication coefficient. Alternatively, the intermediate profile may be directly taken as the final amplitude profile 7, by recognizing the equivalence between the frequencies of the baseband signal and the distance from the transceiver.

Nevertheless, other methods of calculating the amplitude profile 7 are known to the skilled person and may be used for the purposes of the invention.

Then, the processing unit 3 is configured to analyze the amplitude profile 7 to detect signal values representative of the presence of objects 4 in the environment. These values are detected as exceeding an amplitude threshold, whereas under the threshold the detected signal is deemed to only represent environmental noise or noise associated with the electronics of the system. The amplitude threshold may be constant, or more preferably may variable as a function of position, with curves that can be calculated using known methods.

In addition to the above discussed signal values, the processing unit 3 is configured to detect the object positions 41 corresponding to such values according to the amplitude profile 7, thereby completing the detection of objects 4 for one cycle.

Figure 3:
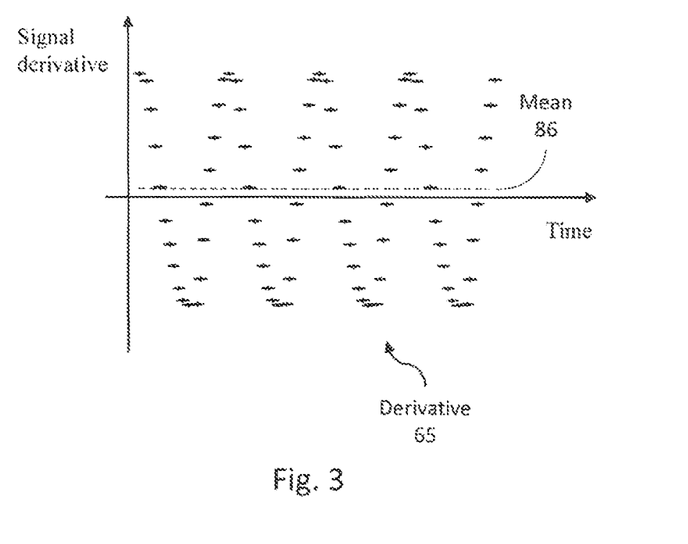

With regard to the processing directed to the diagnostic tasks of the detection system 1, the processing unit is configured to calculate, at each cycle, at least one parameter 8 connected to values of the digital signal 64 or the derivative 66 thereof. It should be particularly noted that the parameter 8 is derived from the digital signal 64 without accounting for any further processing thereof, as the calculation of the amplitude profile 7.

Preferably, for reasons that will be further explained below, the at least one parameter 8 is selected from a maximum value 81, a minimum value 82, an arithmetic mean value 83, a maximum peak-to-peak amplitude 84, and a number of substantially zero values 85 calculated for the discrete sequence of values 65 of the digital signal 64, or an arithmetic mean value 86 of the time derivative 66 of the discrete sequence of values 65 of the digital signal 64.

Particular advantages are derived from calculating a plurality of such parameters 8, for example two parameters 8 (i.e. a first parameter 8 and a second parameter 8) or three parameters 8 (by introducing a third parameter 8), and in the preferred embodiment all the listed parameters 8 are calculated. In this computation, for reasons set out below, considering the couple of maximum value 81 and minimum value 82 as a unique parameter 8 may be preferable. For example, in one embodiment the first parameter can be given by the couple of maximum and minimum value 81, 82, and the second parameter 8 can be given by the arithmetic mean 83 of the discrete sequence of values 65 of the digital signal 64.

Figure 4:
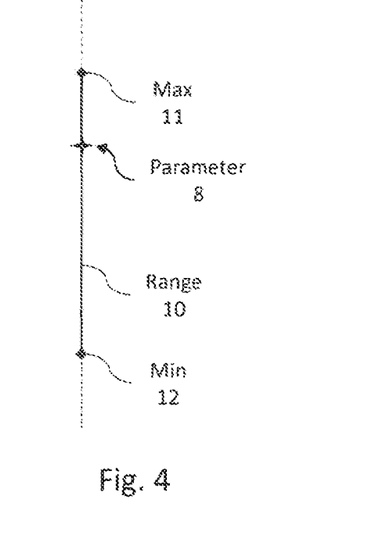

The processing unit 3 is configured to compare, again at each cycle, each parameter 8 with at least one respective predetermined reference range 10. These ranges 10 may be closed, i.e. ranges 10 with maximum and minimum extreme values 11, 12, or open, when they are only limited by one of a maximum extreme value 11 and a minimum extreme value 12.

If the at least one parameter 8 is outside the respective reference range 10, the processing unit 3 is configured to generate a corresponding alarm signal 9 containing an indication related to at least one possible type of anomaly in the measuring system 2. In other words, the processing unit 3 recognizes that, the measuring system 2 allegedly does not operate in its regular operation mode, and the parallel processing operations aimed at detecting objects 4 in the environment may provide results that are not representative of the real objects 4 in the environment.

In the most advantageous embodiments, for each type of parameter 8 outside the corresponding range 10, the processing unit 3 is configured to indicate at least one specific anomaly. In particular, the alarm 9 contains an indication of which macro-component(s) and/or subcomponent(s) of the measuring system is affected by the anomaly, for example in the group of the waveform generator 21, the transmitting and receiving means 22, the conditioning circuit 23, the analog-to-digital converter 24 and subcomponents thereof. In some embodiments, though distinguishing macro-components and subcomponents may help understanding the system operation, they might be treated in the same way under the diagnostic aspects, and so they might be designated just as components wherever held appropriate.

The alarm 9 may also contain an indication of the type of anomaly affecting a component. The main categories of anomalies are grouped into interruptive anomalies, distortive anomalies and power supply anomalies.

An interruptive anomaly of a macro-component is intended to mean that the component provides no output signal or provides only a substantially zero signal. This may be associated, for example, with such a fault of a subcomponent of the macro-component, that the pattern of the output signal is uncoupled from the at least one incoming operation input and they are made independent of each other. Therefore, the output signal is absent or remains constant, particularly equal to zero, as it is not affected by the operation input.

Namely, an interruptive anomaly may be given by an undesired circuit interruption in a macro-component. More in detail, the circuit interruption occurs in a subcomponent that is located in a main signal path of the component, that establishes electromagnetic continuity between the operation input and the output signal.

In case of a distortive anomaly of a macro-component, as the macro-component receives a specific operation input, it provides an output signal that significantly differs from a predetermined signal that would be obtained from the same macro-component in the regular operating condition, when receiving the same operation input.

In this case, the pattern of the output signal of the macro-component is not independent from the operation input but is distorted in an unexpected manner by at least one damaged subcomponent of the macro-component. This may be the case, for example, of a change of a circuit parameter associated with a subcomponent, e.g. its resistance, or a fault in a subcomponent external to the main signal path of the macro-component.

Finally, in case of power supply anomaly of a macro-component, the operation of the macro-component is altered due to a power supply level that is significantly different from a respective predetermined power supply level. In this case, there may not be a fault in any subcomponent of the macro-component, but an alteration of the output signal due to causes external to the macro-component.

The preferred parameters 8 calculated by the processing unit 3, and the corresponding types of anomaly associated with the alarm signal 9 being generated, will be now introduced. It shall be noted that the various alarms 9 may be, for example, acoustic and/or visual alarms 9, and the way that an alarm 9 may contain an indication of an anomaly may comprise displaying information concerning the anomaly, preferably on a display of the processing unit 3 or outside it. Therefore, the indications can be provided in various manners, but they are always to be intended as explicit indications. Generic fault alarms 9 in the radar, which does not provide intelligible information related to at least one type of anomaly or a component affected by the anomaly, are to be regarded as not containing any of the described indications.

A first preferred example of a parameter 8 is given by the maximum peak-to-peak amplitude 84 of the discrete sequence of values 65 of the digital signal 64, i.e. the difference between its maximum value 81 and its minimum value 82. The relative reference range 10 is delimited at the bottom by a minimum reference peak-to-peak amplitude. If this parameter 8 falls below the minimum reference peak-to-peak amplitude, a corresponding peak-to-peak amplitude alarm signal 9 will be generated.

The peak-to-peak amplitude alarm 9 may contain an indication of an interruptive anomaly for the waveform generator 21, which prevents it from providing the signal to be transmitted.

Furthermore, the peak-to-peak amplitude alarm 9 may contain an indication of an interruptive anomaly for the transmitting and receiving means 22, which prevents it from transmitting the first electromagnetic signal 51 or from providing the received electrical signal 62. It shall be noted that, for the transmitting and receiving means 22 two distinct operation inputs may be detected, i.e. the signal to be transmitted and the second electromagnetic signal 52, and that they correspond to two distinct signals provided at the output, i.e. the first electromagnetic signal 51 and the received electrical signal 62.

Finally, the peak-to-peak amplitude alarm 9 may contain an indication of an interruptive anomaly for the conditioning circuit 23, which prevents it from providing the baseband electrical signal 63.

Therefore the peak-to-peak amplitude alarm 9 is generally associated with a signal with a minimum time variability. This corresponds to the fact that the first electromagnetic signal 51 is missing, due to faults of the waveform generator 21 or the transmitting and receiving means 22 (namely the transmitting elements), or that the second electromagnetic signal 52, with later conversion and processing, cannot reach the analog-to-digital converter 24 due to faults in the transmitting and receiving means 22 (namely the receiving elements) or in the conditioning circuit 23.

As explained hereinbelow, a different parameter 8 is used to detect interruptive anomalies in the analog-to-digital converter 24. This parameter 8 is more representative of this type of fault.

If an alarm 9, like in the aforementioned case, can be indicative of a plurality of anomalies, the anomalies may be all individually associated to the alarm signal 9, for example displayed on the display, or may be collectively indicated. For example, the peak-to-peak amplitude alarm 9 may be accompanied by an indication of an interruptive fault between the waveform generator 21 and the conditioning circuit 23, i.e. upstream from the analog-to-digital converter 24.

Furthermore, while in the preferred embodiment both the components affected by the anomaly and the types of anomaly are indicated for each alarm type, in other embodiments, the alarm 9 can contain only indications related to the component, and not to the type of anomaly.

In addition, the alarm 9 associated with a parameter 8 preferably contains indications related to all the anomalies indicated, but embodiments may be also provided in which only one of these anomalies or anyway a subset thereof, is indicated, for example because other anomalies are indicated by the deviation of other parameters 8.

It should be also noted that in alternative, for each macro-component indicated as affected by an anomaly, it is also permitted an indication of one or more subcomponents of the macro-component, if deviation of the involved parameter 8 is held to be particularly representative of an anomaly for specific subcomponents, rather than for the whole macro-component. The indication of a subcomponent can be also regarded as an indication of a specific anomaly type of a macro-component, e.g. related to interruptive, distortive or power supply anomalies.

These considerations apply both to the first preferred parameter 8 described above and to the further preferred parameters 8 which follow.

A second preferred parameter 8 is given by any of the maximum value 81 and the minimum value 82 of the discrete sequence of values 65 of the digital signal 64, or both the maximum and minimum value 81, 82 considered as a couple. An extreme value alarm signal 9 corresponds to these parameters 8, with the maximum value being above a reference maximum value 81 or the minimum value 82 being below a reference minimum value. However, in other embodiments, the extreme value alarm 9 is only generated when both the maximum value 81 and the minimum value 82 are outside their respective reference ranges 10.

The extreme value alarm 9 may contain an indication of a distortive anomaly for the waveform generator 21, which prevents the electrical signal to be transmitted 61 from matching the predetermined waveform. In particular, this anomaly results in extreme values beyond the respective thresholds when the electrical signal to be transmitted 61 is generated according to frequencies other than the frequencies of the predetermined waveform.

Furthermore, the extreme value alarm 9 may contain an indication of a power supply anomaly for the transmitting and receiving means 22 which causes the first electromagnetic signal 51 to be transmitted with a transmission power that is greater than the predetermined power.

In addition, the extreme value alarm 9 may contain an indication of a distortive anomaly for the conditioning circuit 23 which prevents it from properly converting the received electrical signal 62 into the baseband electrical signal 63. This anomaly particularly affects a gain coefficient of the conditioning circuit 23.

Generally, the extreme value alarm 9 is associated with a saturation of the digital signal 64. In other words, the baseband signal values sampled by the analog-to-digital converter 24 are close to the extremes of the range of values accepted as an input by the analog-to-digital converter 24, or outside this range.

Due to the impossibility of distinguishing signal values outside the range of input values accepted by the analog-to-digital converter 24, and due to safety reasons, during regular operation the baseband signal, and accordingly the sampled signal, are expected to fall between the reference maximum value and the reference minimum value 82.

The couple of maximum value 81 and minimum value 82 can be regarded as a unique parameter 8 since deviation of such values from the reference ranges 10 are associated to indications of the same types of anomalies in the same components. If distinct parameters 8 were chosen being only maximum value 81 and minimum value 82, the use of a plurality of parameters 8 would not allow distinguishing anomalies in different components. Similar groupings of different parameters 8 will be possible if associated to corresponding subsets of macro-components.

A third preferred parameter 8 is given by the average value of the digital signal 64, in more detail the arithmetic mean 83 of the discrete sequence of values 65 of the digital signal 64. When its value is above or below a reference range 10 of mean values, the processing unit 3 is configured to generate a mean-value alarm signal 9.

The mean-value alarm 9 contains an indication of the possibility of a distortive anomaly for the conditioning circuit 23 which prevents it from properly converting the received electrical signal 62 into the baseband electrical signal 63. This anomaly particularly introduces a DC component into the baseband electrical signal 63.

A further possible anomaly indicated by the mean-value alarm 9 is a distortive anomaly for the analog-to-digital converter 24, which prevents the digital signal 64 from matching the baseband electrical signal 63.

The mean-value alarm signal 9 may be further associated with the indication of a power supply anomaly for the analog-to digital converter 24 which prevents the bias voltage from matching the predetermined voltage value. This is because a substantially constant deviation of the bias voltage from the predetermined voltage value shifts the range of input voltages accepted by the analog-to-digital converter 24 and causes a DC component to be introduced into the digital signal 64.

A fourth preferred parameter 8 is the number of substantially zero values 85 (preferably values being exactly zero) of the discrete sequence of values 65 of the digital signal 64, which are preferably consecutive. Thus, the number of zero values 85 may be also identified as a time interval in which the digital signal 64 is substantially equal to zero 85. A zero value number alarm 9 is generated when this parameter 8 is above a reference zero values threshold.

The zero value number alarm 9 may contain an indication of an interruptive anomaly for the analog-to-digital converter 24 which prevents it from providing the digital signal 64.

Furthermore, the zero value number alarm 9 may contain an indication of a distortive anomaly for the analog-to-digital converter 24, which prevents the digital signal 64 from matching the baseband electrical signal 63.

In addition, the zero value number alarm 9 may contain an indication of a power supply anomaly for the analog-to-digital converter 24, which prevents the bias voltage from matching the predetermined voltage value. A large deviation of the bias voltage from the predetermined voltage value may lead to a condition in which the baseband electrical signal 63 is constantly under the range of input voltages accepted by the analog-to-digital converter 24.

In general, the zero value number alarm 9 corresponds to an operation of the analog-to-digital converter 24 that is significantly outside the regular operation. It shall be noted that, while anomalies upstream the analog-to-digital converter 24 may lead to a substantially missing signal at the input of the analog-to-digital converter 24, the digital signal 64 may nevertheless comprise non-zero values, for example due to signal noise. Conversely, a digital signal 64 that remains constantly at zero level indicates in most cases that the anomaly is associated with the analog-to-digital converter 24 or to its power supply.

A fifth preferred parameter 8 is given by the arithmetic mean value 86 of the time derivative 66 of the discrete sequence of values 65 of the digital signal 64. It shall be noted that time derivative 66 of the digital signal 64 is intended to be a sequence of derivate values calculated as the quotient of the differences between consecutive values of the digital signal 64, to the time interval therebetween. A corresponding mean derivative alarm signal 9 is generated by the processing unit 3 when the parameter 8 is below a reference mean derivative.

The mean derivative alarm 9 contains an indication of a power supply anomaly for the transmitting and receiving means 22 which causes the first electromagnetic signal 51 to be transmitted with a transmission power that is smaller than the predetermined power.

It can be appreciated from the foregoing that, even without using all the described parameters 8 and/or by providing only partial indications about the anomalies, an advantageous system may still be provided in which distinct alarm signals 9, generated by the processing unit 3 upon monitoring distinct parameters 8, contain indications of possible anomalies for respective distinct (but not necessarily disjoint) subsets of components of the measuring system 2. In particular, these alarms 9 are generated when two distinct parameters 8 are, one at a time, outside their respective reference ranges 10.

In more detail, in the preferred embodiment the processing unit 3 is configured at each cycle to calculate at least a first parameter 8 and a second parameter 8 chosen among the described ones. A first alarm signal 9 is generated upon deviation of the first parameter 8 from the respective reference range 10, and a second, different, alarm signal 9 is generated upon deviation of the second parameter 8 from the respective reference range 10.

The first alarm signal 9 contains an indication of a first subset of the components of the measuring system, and the second alarm signal 9 contains an indication of a second subset of the components. Thus, both the first and the second subsets comprise each one or more macro-components and/or subcomponents, which optionally overlap partially between first subset and second subset.

Anyway, in the first subset a first macro-component, or a subcomponent of the first macro-component is present, which is not comprised in the second subset. In more detail, the second subset does not comprise either the first macro-component or any subcomponent of the first macro-component. Preferably, the reverse is also true, i.e. in the second subset a second macro-component, or a subcomponent of the second macro-component is present, whereas the first subset does not comprise either the second macro-component or any subcomponent of the second macro-component.

In other words, in this embodiment, despite partial overlaps of the first and second subsets being still possible, either at least one macro-component is designated among the components of the first subset which is not involved in any manner in the second subset, or a sub-component related to a macro-component which is not involved in the second subset. Thus, it is straightforward that the two subsets, besides being distinct in themselves, do not just involve different sub-components of the same macro-component, but they designate anomalies in locations paced more upstream or more downstream within the whole measuring system, differentiated in distinct macro-components.

One example of two parameters 8 that achieve such an advantage are the maximum peak-to-peak amplitude 84 of the digital signal 64, and the number of zero values 85 of the digital signal 64.

Likewise, in some embodiments, distinct alarm signals 9, generated by the processing unit 3 when the distinct parameters 8 are, one at a time, outside their respective reference ranges 10, the processing unit 3 is configured to generate corresponding distinct alarm signals 9 containing indications of respective different types of anomalies for one and the same component of the measuring system 2, preferably according to the types of anomaly as indicated above.

Such distinct signals may correspond to or be different from the aforementioned first and second alarm signals 9, and they may be connected to corresponding or different parameters 8 than the first and second parameters 8 commented above. This possibility may be used also independently to the presence of a first and a second parameter 8 connected to distinct subsets, as specified above.

For example, in one embodiment, the first and second subsets may comprise, besides the respective cited first and second macro-component (or subcomponents thereof) contributing to differentiation of the subset under the macro-component aspect, also a common macro-component (or subcomponents of a common macro-component), for which a first and a second distinct type of anomalies are indicated with respect to deviations of the first and second parameter 8, respectively.

In another example, a third parameter 8 may be monitored too, a third subset of components being associated thereto, including at least a common macro-component (or a subcomponent of the common macro-component). Such macro-component is included (as a whole, or through a subcomponent thereof) also in the first subset and/or the second subset and/or a fourth subset connected to a fourth parameter 8. The types of anomalies indicated for the common macro-component are different for the third parameter 8 and the other parameter 8, being the first, second or fourth parameter 8.

The terms first, second, third and fourth are used herewith just to designate different parameters 8 and corresponding anomalies, subsets, and signals, without limitation to a specific order of such data. Wherever appropriate under the clarity aspect, the numeral adjectives might be reordered or replaced by other wordings designating distinct data.

One example of two parameters 8 used for different types of anomaly in a common macro-component are the maximum peak-to-peak amplitude 84 of the digital signal 64 and the maximum and/or minimum values 81, 82 of the digital signal 64.

In one embodiment, the detection system 1 may also comprise a plurality of measuring systems 2 in signal communication with a single processing unit 3, or equivalently with respective processing units 3 that cooperate to provide the tasks of detecting objects 4 in the environment and performing diagnostics on the measuring systems 2.

The transmitting and receiving means 22 of each measuring system 2 are configured to transmit respective first electromagnetic signals 51 in respective portions of the environment, which may be distinct or at least partially overlap.

Accordingly, a distinct digital signal 64 corresponds to each measuring system 2 and the processing unit 3 is configured to calculate, for each measuring system 2, a respective amplitude profile 7, and to analyze the amplitude profile 7 by identifying object positions 41 as described above.

The provision of multiple measuring systems 2, each of which may comprise a respective transceiver, may be advantageous to detect the position 41 of objects 4 not only in terms of distance from a transceiver, but also in terms of direction in a plane or in space, as given by one or more angles. This may be achieved by combining the amplitude profiles 7 for distinct measuring systems 2.

Various examples of specific arrangements of the transmitting and receiving means 22 of the measuring systems 2, and of possible types of waveforms to be generated and of the processing operations performed by the processing unit 3 to identify the direction of objects 4 in the environment, are known to the skilled person and will not be described in further detail herein.

Nevertheless, in such measuring systems 1 the processing unit 3 may implement additional diagnostic tasks, whose purpose is to recognize that an anomaly occurs in a specific measuring system 2.

In one example the processing unit 3 is configured to compare at least one parameter 8 for distinct measuring systems 2, which can be the first parameter 8, the second parameter 8, or any other parameter 8 among the described ones. The comparison is particularly made on the same parameter 8, e.g. the arithmetic mean values 83 of the digital signals 64 of distinct measuring systems 2. However, independent comparisons may be carried out on a plurality of the above discussed parameters 8.

Therefore, the processing unit 3 is configured to generate an alarm signal 9 indicative of an anomaly in one of the measuring systems 2 if the at least one parameter 8 differs across the distinct measuring systems 2 by more than one consistency threshold. Different consistency thresholds may be selected for different parameters 8.

In another example, the processing unit 3 is configured to compare the detected object positions 41 for distinct measuring systems 2. These object positions 41 are compared having regard to the spatial arrangement of the transmitting and receiving means 22 of the various measuring systems 2. In other words, the comparison of the positions must be performed with a common reference frame for all measuring systems 2, so that a single object 4 in the environment, during regular operation, will be detected for all the measuring systems 2 (at least those with the object 4 falling within their field of view) in matching positions.

Therefore, the processing unit 3 is configured to generate an alarm signal 9 indicative of an anomaly in one of the measuring systems 2 if the detected object positions 41 do not match for distinct measuring systems 2. One example of mismatch occurs when one object 4 is in the field of view of multiple measuring systems 2, but for one of them no object 4 is detected or detection occurs only in positions that are incompatible with the other measuring systems 2. Then, the processing unit recognizes the presence of the object 4 from the measurement system 2 that has a regular operation, and indicates an anomaly for the measuring system 2 that does not detect the object 4.

In this example, it shall be noted that the information used to locate the anomaly is detected from the amplitude profiles 7, and not directly from the digital signal 64.

These findings will be facilitated if compatible parameters 8 or positions are detected for at least two measuring systems 2, while being incompatible in a third system. However, if two measuring systems 2 are only provided, an anomaly may still be recognized, but it will be more difficult to understand which of the measuring systems 2 is affected by the anomaly.

In another example, the processing unit 3 is configured to calculate a stability value for the digital signal 64 and/or the amplitude profile 7 associated with each measuring system 2. Then, the processing unit 3 is configured to compare the stability values for the different measuring systems 2, and to generate an alarm signal 9 indicative of an anomaly in one of the measuring systems 2 if the stability values do not match.

A skilled person may obviously envisage a number of equivalent changes to the above discussed variants, without departure from the scope defined by the appended claims.

The invention claimed is:

1. A system for detecting objects in an environment, comprising a measuring system and a processing unit in signal communication with the measuring system, wherein:

the measuring system comprises macro-components, wherein each of the macro-components is formed of respective subcomponents, wherein the macro-components comprise:

a waveform generator configured to cyclically provide an electrical signal to be transmitted with a predetermined waveform, transmitting and receiving means configured to transmit into the environment, at each cycle, a first electromagnetic signal matching the electrical signal to be transmitted and to receive from the environment a second electromagnetic signal generated by a reflection of the first electromagnetic signal in the environment, thereby providing a received electrical signal matching the second electromagnetic signal, an analog conditioning circuit configured to provide, at each cycle, a baseband electrical signal by baseband converting the received electrical signal, and an analog-to-digital converter configured to provide, at each cycle, a digital signal which is a discrete sequence of values obtained by sampling the baseband electrical signal in plural time instants, the processing unit is configured, at each cycle, to:

calculate from the digital signal a signal amplitude profile in which signal amplitude values are associated with a set of positions of origin by the reflection of the first electromagnetic signal in the environment, and analyze the signal amplitude profile to detect signal values representative of a presence of objects in the environment and corresponding object positions, wherein the processing unit is further configured, at each cycle, to:

calculate, as distinct parameters, at least a first parameter and a second parameter wherein all the distinct parameters are individually chosen between:

a couple composed of a maximum value and a minimum value of the discrete sequence of values of the digital signal, an arithmetic mean of the discrete sequence of values of the digital signal, a maximum peak-to-peak amplitude from the values of the discrete sequence of values of the digital signal, a number of substantially zero values in the discrete sequence of values of the digital signal, and an arithmetic mean of a time derivative of the discrete sequence of values of the digital signal, compare the distinct parameters with respective distinct predetermined reference ranges, and if the first parameter is outside its respective reference range, generate a first alarm signal containing an indication of a first subset of macro-components and/or subcomponents of the measuring system wherein an anomaly is held possible, if the second parameter is outside its respective reference range, generate a second alarm signal containing an indication of a second subset of macro-components and/or subcomponents of the measuring system wherein an anomaly is held possible, wherein the first subset comprises at least one first macro-component or a subcomponent of the at least one first macro-component, wherein the at least one first macro-component is one of the waveform generator, the transmitting and receiving means, the analog conditioning circuit, or the analog-to-digital converter, and wherein the second subset does not comprise either the at least one first macro-component or any subcomponent of the at least one first macro-component.

2. The system of claim 1, wherein the processing unit, for at least two of the distinct parameters, when the distinct parameters are, one at a time, outside their respective reference ranges, is configured to generate corresponding distinct alarm signals, each containing an indication of a respective distinct type of anomaly which is held possible, and an indication of a macro-component or a subcomponent of the measuring system to which the anomaly is referred, wherein the indicated macro-component or subcomponent is the same for the at least two of the distinct parameters.

3. The system of claim 2, wherein each of the indications of the respective distinct types of anomalies comprises an indication designating one of the following anomalies:
   an interruptive anomaly of a macro-component or a subcomponent of the macro-component, whereby the macro-component provides no output signal or provides only a substantially zero signal,
   a distortive anomaly of the macro-component or the subcomponent of the macro-component, whereby as the macro-component receives a specific operation input, the macro-component provides an output signal that significantly differs from a predetermined signal that would be obtained from the same macro-component in a regular operating condition, when receiving the same operation input, or
   a power supply anomaly of the macro-component or the subcomponent of the macro-component, whereby operation of the macro-component is altered due to a power supply level that significantly differs from a respective predetermined power level.

4. The system of claim 1, wherein the second subset comprises a second macro-component or a subcomponent of the second macro-component,
   wherein the second macro-component is one of the waveform generator, the transmitting and receiving means, the analog conditioning circuit, or the analog-to-digital converter, and
   wherein the first subset does not comprise either the second macro-component or any subcomponent of the second macro-component.

5. The system of claim 1, wherein for a value of the first and/or second parameter given by the maximum peak-to-peak amplitude that is below a reference minimum peak-to-peak amplitude, a corresponding first and/or second peak-to-peak amplitude alarm signal contains an indication designating at least one of the following anomalies:
   an interruptive anomaly for the waveform generator, which prevents the waveform generator from providing the signal to be transmitted, and/or
   an interruptive anomaly for the transmitting and receiving means, which prevents the transmitting and receiving means from transmitting the first electromagnetic signal or from providing the received electrical signal, and/or
   an interruptive anomaly for the analog conditioning circuit, which prevents the analog conditioning circuit from providing the baseband electrical signal.

6. The system of claim 1, wherein for a value of the first and/or second parameter given by the couple of the maximum value and the minimum value, for the maximum value being above a reference maximum value and/or for the minimum value being below a reference minimum value, a corresponding first and/or second extreme value alarm signal contains an indication designating at least one of the following anomalies:
   a distortive anomaly for the waveform generator, which prevents the electrical signal to be transmitted from matching the predetermined waveform, and/or
   a power supply anomaly for the transmitting and receiving means which causes the first electromagnetic signal to be transmitted with a transmission power that is greater than a predetermined power, and/or
   a distortive anomaly for the analog conditioning circuit, which prevents the analog conditioning circuit from properly converting the received electrical signal into the baseband electrical signal.

7. The system of claim 1, wherein for a value of the first and/or second parameter given by the arithmetic mean of the discrete sequence of values of the digital signal that is above or below a reference mean value range, a corresponding first and/or second mean value alarm signal contains an indication designating at least one of the following anomalies:
   a distortive anomaly for the analog conditioning circuit, which prevents the analog conditioning circuit from properly converting the received electrical signal into the baseband electrical signal, and/or
   a distortive anomaly for the analog-to-digital converter, which causes the values of the discrete sequence of values of the digital signal to be significantly different from the baseband electrical signal in the plural time instants.

8. The system of claim 1, wherein for a value of the first and/or second parameter given by the number of substantially zero values above a reference zero value threshold, a corresponding first and/or second zero value number alarm contains an indication designating at least one of the following anomalies:
   a distortive anomaly for the analog-to-digital converter, which causes the values of the discrete sequence of values of the digital signal to be significantly different from the baseband electrical signal in the plural time instants, and/or
   an interruptive anomaly for the analog-to-digital converter, which prevents the analog-to-digital converter from providing a non-zero digital signal.

9. The system of claim 7, wherein:
   the analog-to-digital converter is configured to be supplied with a bias voltage matching a predetermined voltage value, and
   the indication designating the distortive anomaly for the analog-to-digital converter comprises an indication designating a power supply anomaly for the analog-to digital converter, which prevents the bias voltage from matching the predetermined voltage value.

10. The system of claim 1, wherein for a value of the first and/or second parameter given by the arithmetic mean of the time derivative of the discrete sequence of values of the digital signal which is below a reference mean derivative, a corresponding first and/or second mean derivative alarm signal contains an indication designating a power supply anomaly for the transmitting and receiving means which causes the first electromagnetic signal to be transmitted with a transmission power that is lower than a predetermined power.

11. The system of claim 1, further comprising a plurality of measuring systems, wherein the transmitting and receiving means of each measuring system is configured to transmit respective first electromagnetic signals in respective portions of the environment, wherein:

the processing unit is further configured to compare for distinct measuring systems, at least one parameter chosen from the couple of the maximum value and the minimum value, the arithmetic mean of the discrete sequence of values, the maximum peak-to-peak amplitude, the number of substantially zero values, and the arithmetic mean of the time derivative of the sequence of values, and to generate an alarm signal containing an indication of one of the measuring systems in which an anomaly is held possible, if the at least one parameter differs across the distinct measuring systems by more than one consistency threshold.

12. The system of claim 1, further comprising a plurality of measuring systems, wherein the transmitting and receiving means of each measuring system is configured to transmit respective first electromagnetic signals in respective portions of the environment, and wherein the processing unit is configured to calculate, for each measuring system, a respective amplitude profile, wherein:

the processing unit is configured to compare, for distinct measuring systems, the detected object positions, and to generate an alarm signal containing an indication of one of the measuring systems in which an anomaly is held possible, if such positions do not match across the distinct measuring systems.

13. The system of claim 1, wherein:

for a first and/or second parameter given by the maximum peak-to-peak amplitude, a corresponding first and/or second subset comprises at least one of the waveform generator, the transmitting and receiving means, the analog conditioning circuit, or a subcomponent thereof, for the first and/or second parameter given by the couple of the maximum value and the minimum value, the corresponding first and/or second subset comprises at least one of the waveform generator, the transmitting and receiving means, the analog conditioning circuit, or a subcomponent thereof, for the first and/or second parameter given by the arithmetic mean of the discrete sequence of values of the digital signal, the corresponding first and/or second subset comprises at least one of the analog conditioning circuit, the analog-to-digital converter, or a subcomponent thereof, for the first and/or second parameter given by the number of substantially zero values, the corresponding first and/or second subset comprises the analog-to-digital converter or a subcomponent thereof, and for a first and/or second parameter given by the arithmetic mean of the time derivative of the discrete sequence of values of the digital signal, the corresponding first and/or second subset comprises the transmitting and receiving means or a subcomponent thereof.

* * * * *